(12) United States Patent
Sugiyama et al.

(10) Patent No.: US 9,417,490 B2
(45) Date of Patent: Aug. 16, 2016

(54) LIQUID CRYSTAL DISPLAY DEVICE

(71) Applicant: JAPAN DISPLAY INC., Tokyo (JP)

(72) Inventors: Saori Sugiyama, Tokyo (JP); Yuji Maede, Tokyo (JP); Masateru Morimoto, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 15/046,839

(22) Filed: Feb. 18, 2016

(65) Prior Publication Data

US 2016/0170274 A1   Jun. 16, 2016

Related U.S. Application Data

(63) Continuation of application No. 14/532,035, filed on Nov. 4, 2014, now Pat. No. 9,298,048.

(30) Foreign Application Priority Data

Nov. 6, 2013   (JP) .................................. 2013-230507

(51) Int. Cl.
*G02F 1/1343*   (2006.01)
*G02F 1/1333*   (2006.01)
*G02F 1/1362*   (2006.01)

(52) U.S. Cl.
CPC .... *G02F 1/134336* (2013.01); *G02F 1/133345* (2013.01); *G02F 1/136286* (2013.01)

(58) Field of Classification Search
CPC ........ G02F 2001/134318; G02F 2001/134381; G02F 1/134363; G02F 1/133707; G02F 1/136213; G02F 1/136286; G02F 1/134336; G02F 1/1345; G02F 1/13439; G02F 1/133512; G02F 1/13458; H01J 11/00–11/54; H01J 17/49; H01L 27/1214–27/1296
USPC ............................ 349/39, 141–143, 147–148
See application file for complete search history.

(56) References Cited

U.S. PATENT DOCUMENTS

| | | | |
|---|---|---|---|
| 6,642,984 B1 | 11/2003 | Yoshida et al. | |
| 7,999,879 B2 * | 8/2011 | Yoshida | G02F 1/134363 349/129 |
| 2001/0046027 A1 | 11/2001 | Tai et al. | |
| 2002/0101557 A1 | 8/2002 | Ono et al. | |
| 2002/0105613 A1 | 8/2002 | Yamakita et al. | |
| 2004/0125253 A1 | 7/2004 | Kim et al. | |
| 2004/0196417 A1 | 10/2004 | Okazaki et al. | |
| 2004/0263710 A1 | 12/2004 | Song et al. | |
| 2009/0160748 A1 | 6/2009 | Kimura et al. | |
| 2009/0185123 A1 | 7/2009 | Morimoto et al. | |
| 2009/0225260 A1 | 9/2009 | Adachi et al. | |
| 2011/0128491 A1 | 6/2011 | Kubota et al. | |
| 2012/0257151 A1 | 10/2012 | Teramoto et al. | |

(Continued)

FOREIGN PATENT DOCUMENTS

JP   2009-150925 A   7/2009

*Primary Examiner* — Anne Hines
*Assistant Examiner* — Jose M Diaz
(74) *Attorney, Agent, or Firm* — Typha IP LLC

(57) ABSTRACT

A liquid crystal display device in which smear error is suppressed and transmittance is uniform is provided. In a liquid crystal display device which includes a plurality of pixels and uses comb-teeth-shaped transparent conductive films 110 as common wirings, the common wirings include mesh-shaped common metal wirings 101v and 101h extending in a vertical direction and a horizontal direction and the comb-teeth-shaped transparent conductive films 110 are connected between adjacent pixels.

12 Claims, 12 Drawing Sheets

(56) References Cited

U.S. PATENT DOCUMENTS

| | | | |
|---|---|---|---|
| 2013/0201434 A1* | 8/2013 | Murata | G02F 1/134363 349/141 |
| 2013/0250225 A1 | 9/2013 | Maeda et al. | |
| 2013/0300989 A1 | 11/2013 | Hibayashi et al. | |
| 2014/0009711 A1 | 1/2014 | Tomioka et al. | |
| 2014/0176885 A1 | 6/2014 | Okita et al. | |
| 2015/0085215 A1 | 3/2015 | Yoshida | |
| 2015/0205161 A1 | 7/2015 | Okita et al. | |
| 2015/0301381 A1 | 10/2015 | Okita | |

* cited by examiner

F I G . 3 B
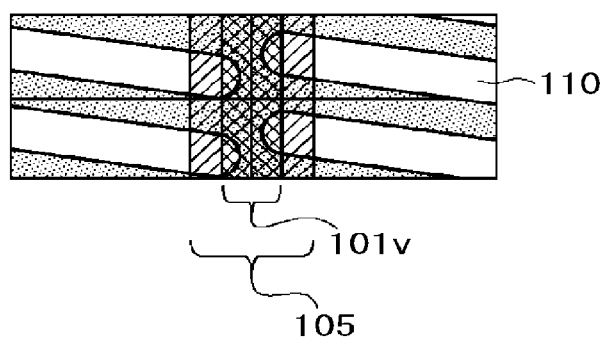
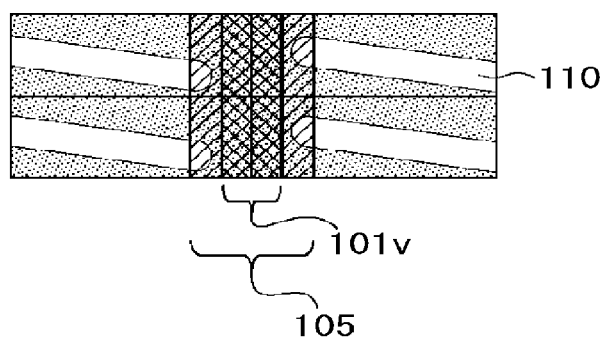

F I G . 4
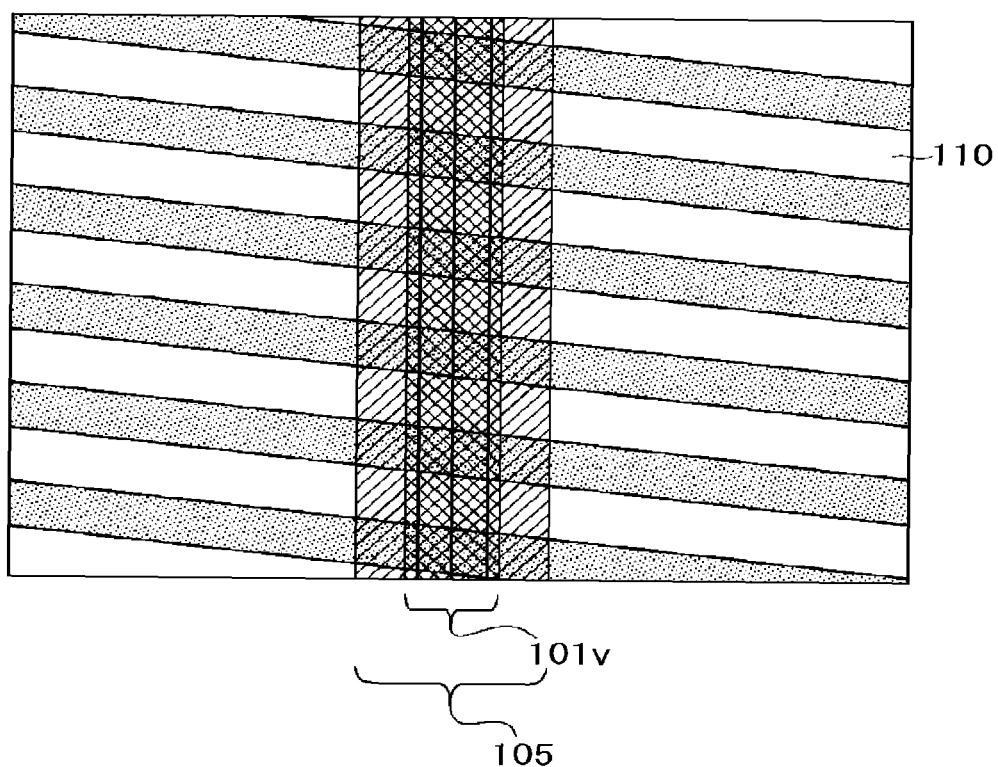

F I G . 5 B
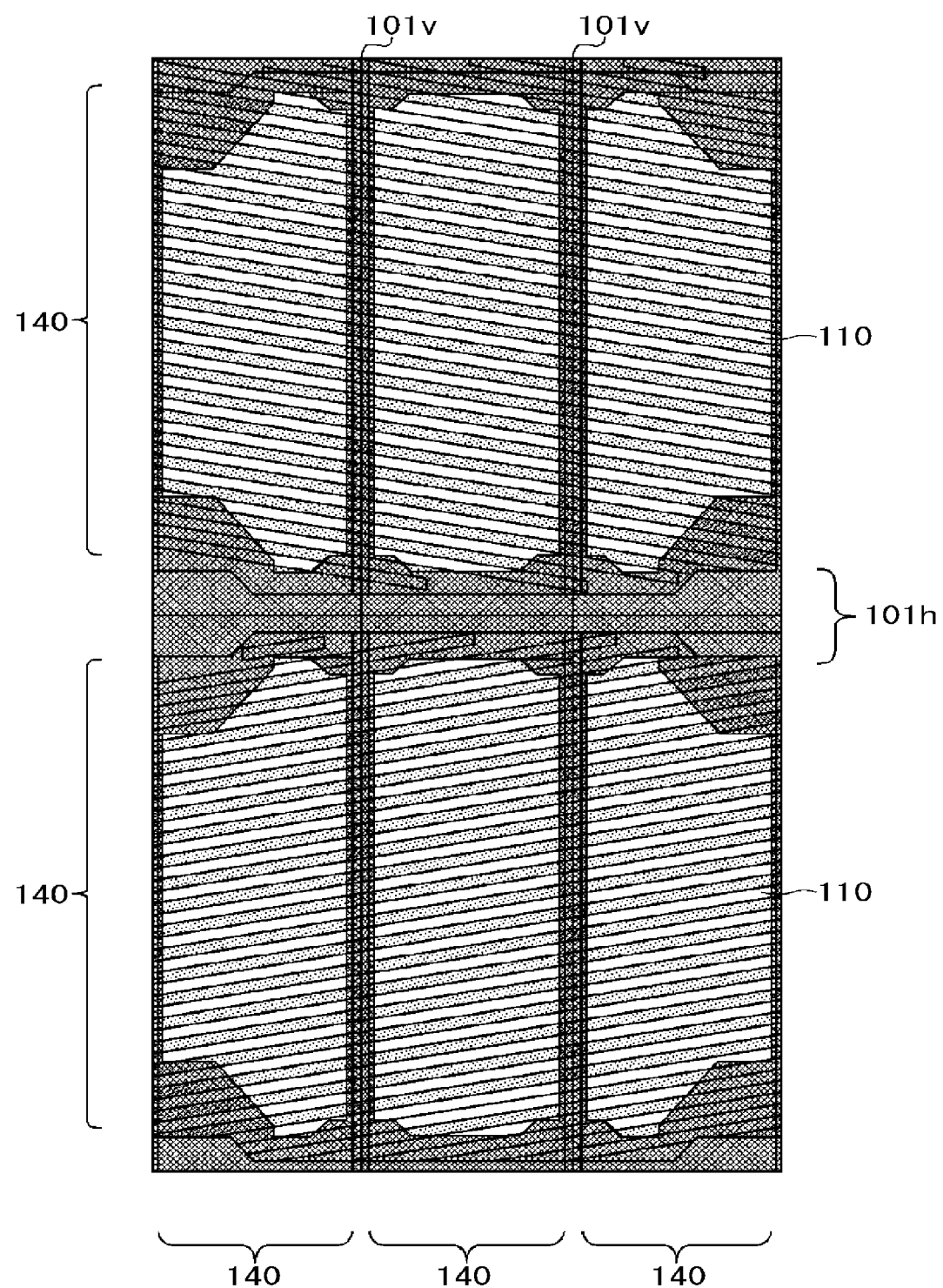

F I G . 6
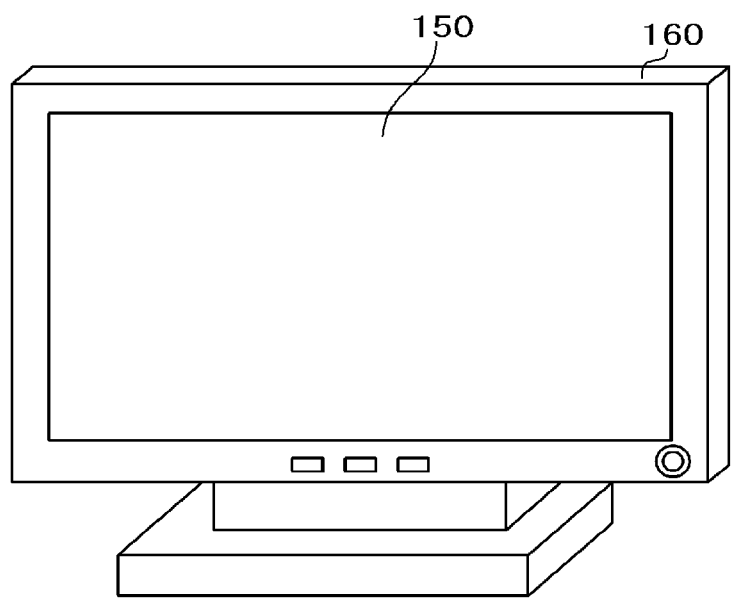

LIQUID CRYSTAL DISPLAY DEVICE

CROSS-REFERENCE TO RELATED APPLICATION

This application is a continuation of U.S. patent application Ser. No. 14/532,035, filed on Nov. 4, 2014. Further, this application claims priority from Japanese patent application JP 2013-230507, filed on Nov. 6, 2013, the entire contents of which are hereby incorporated by reference into this application.

TECHNICAL FIELD

The present invention relates to a liquid crystal display device and a manufacturing method thereof.

BACKGROUND ART

In a large screen and high resolution monitor product (the number of pixels is about 10 M/30 inches) for broadcasting and medical applications, wiring length becomes long and wiring resistance becomes high, so that smear error often occurs. This tendency is also seen in a C-Top IPS (In-Plane Switching) type liquid crystal display device in which common wiring formed by a transparent conductive film (ITO) is arranged at an upper area of pixel electrode, so that a countermeasure against smear is performed by additionally creating horizontal common metal wiring having the same potential as that of the common ITO in order to reduce common resistance, in particular, in the horizontal direction in which the device size is large. FIG. 1A illustrates a schematic plan view of a partial configuration of a display area of the liquid crystal display device. Drain lines 105 that are video signal lines are arranged in the vertical direction. An area surrounded by the drain lines 105 and scanning signal lines arranged in the horizontal direction forms a pixel. A large number of common ITO wirings 110 are arranged in a pixel area. A horizontal common metal wiring 101h is arranged in an area (horizontal direction) overlapping the scanning signal line (gate wiring). The liquid crystal display device is disclosed in, for example, Japanese Unexamined Patent Application Publication No. 2009-150952

SUMMARY OF THE INVENTION

Technical Problem

Liquid crystal display devices for monitor products tend to have a larger screen and higher resolution. Therefore, a trial product of a liquid crystal display device having a much larger screen is manufactured, and then it is found that a countermeasure of only adding horizontal common metal wirings is not sufficient to prevent the smear error. To further reduce the common wiring resistance, the inventors examined a structure in which vertical common metal wirings having the same potential as that of the common ITO are added to the horizontal common metal wirings and the horizontal common metal wirings and the vertical common metal wirings are arranged in a mesh pattern. FIG. 1B illustrates a schematic plan view of a partial configuration of a display area of this liquid crystal display device. A vertical common metal wiring 101v is arranged in an area overlapping the drain line 105, which is a video signal line. When the metal wirings are arranged in a mesh pattern in the vertical and horizontal directions, the common resistance in the vertical direction can be reduced by about 10% and the smear error is suppressed.

However, it is found that the appearance of domain areas (non-transparent areas) changes while being driven and the transmittance changes.

An object of the present invention is to provide a liquid crystal display device in which the smear error is suppressed and the transmittance is uniform.

Solution to Problem

As an embodiment to achieve the above object, in a liquid crystal display device which includes a plurality of pixels and uses comb-teeth-shaped transparent conductive films as common wirings, the common wirings include mesh-shaped common metal wirings extending in a vertical direction and a horizontal direction, and the comb-teeth-shaped transparent conductive films are connected between adjacent pixels.

Further, in a liquid crystal display device which includes a plurality of pixels and pluralities of video signal lines and scanning signal lines, each of which is connected to the plurality of pixels, and uses comb-teeth-shaped transparent conductive films as common wirings, the common wirings include mesh-shaped common metal wirings extending in a direction along the video signal lines and a direction along the scanning signal lines, and the comb-teeth-shaped transparent conductive films are connected between pixels adjacent to each other with the video signal line in between.

Further, in a liquid crystal display device which includes a plurality of pixels and pluralities of video signal lines and scanning signal lines, each of which is connected to the plurality of pixels, and uses comb-teeth-shaped transparent conductive films as common wirings, the common wirings include mesh-shaped common metal wirings extending in a direction along the video signal lines and a direction along the scanning signal lines, and the comb-teeth-shaped transparent conductive films are connected between pixels adjacent to each other with the scanning signal line in between.

Advantageous Effect of the Invention

According to the present invention, it is possible to provide a liquid crystal display device in which the smear error is suppressed and the transmittance is uniform.

BRIEF DESCRIPTION OF THE DRAWINGS

FIG. 3B is plan views of the common wiring of the liquid crystal display device examined by the inventors. An upper diagram illustrates a case in which a comb tooth tip is formed by ITO+metal and a lower diagram illustrates a case in which a comb tooth tip is formed by only ITO.

FIG. 4 is a plan view of common wirings of a liquid crystal display device according to the first embodiment of the present invention.

FIG. 5B is a plan view of a pixel portion of a liquid crystal display device according to a second embodiment of the present invention.

FIG. 6 is an example of a conventional monitor product and a monitor product according to the embodiments of the present invention.

DESCRIPTION OF THE PREFERRED EMBODIMENTS

Figure 1A:
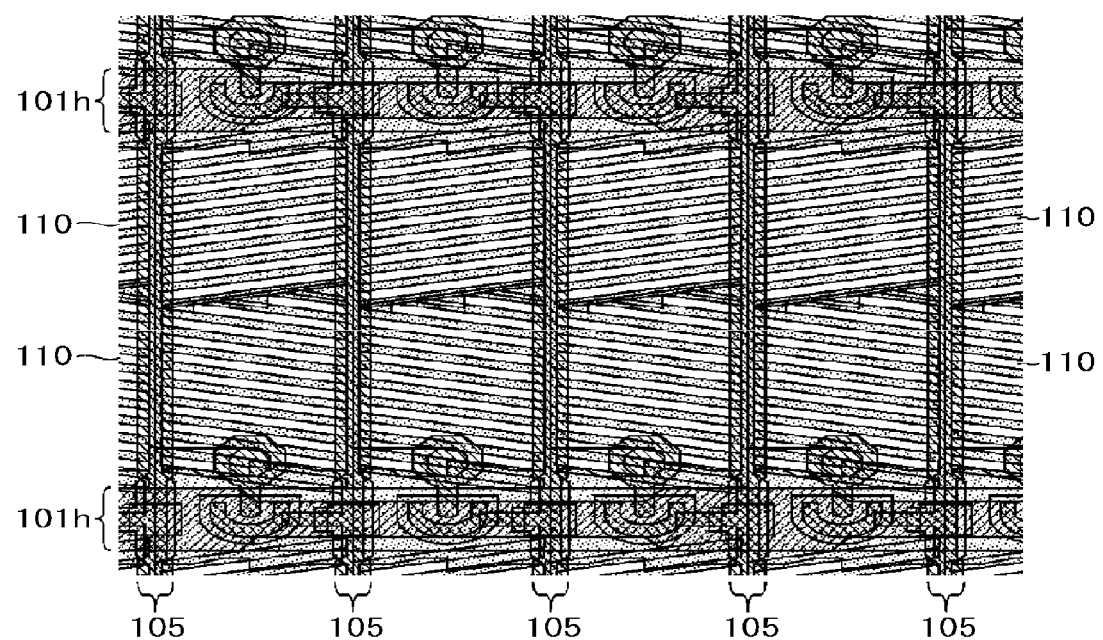
FIG. 1A is a schematic plan view of a main part (pixel portion including common wirings) of a display area of a conventional liquid crystal display device.
Figure 1B:
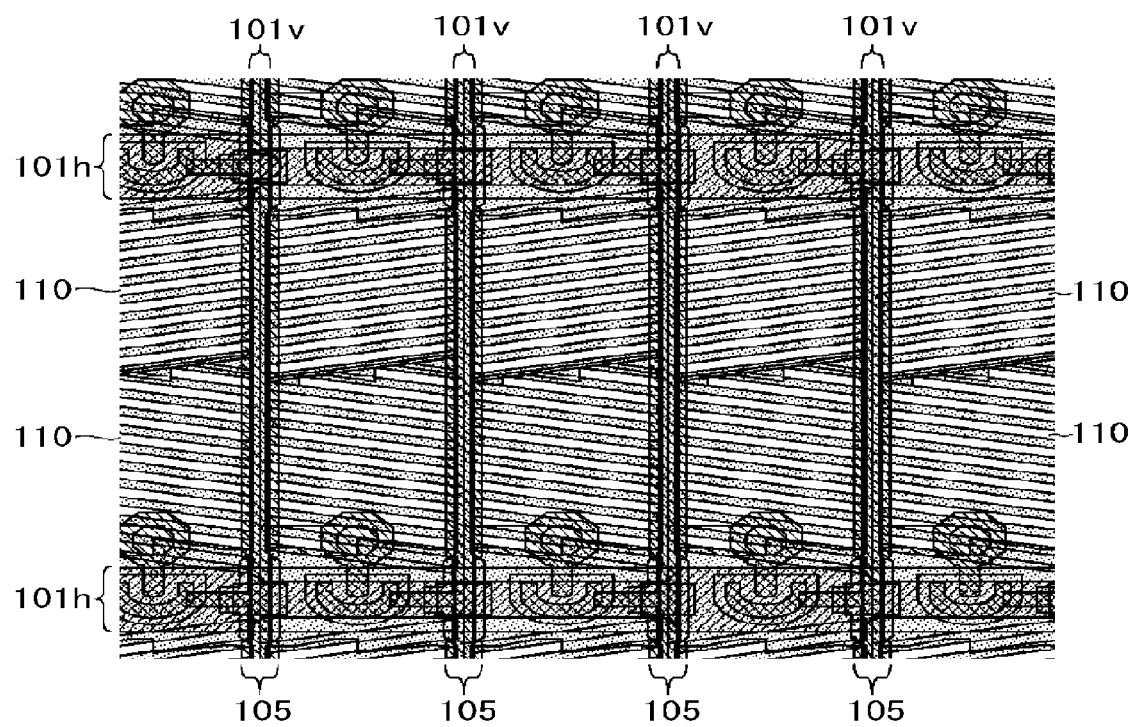
FIG. 1B is a plan view of a main part (common wirings) of a liquid crystal display device examined by the inventors.
Figure 2A:
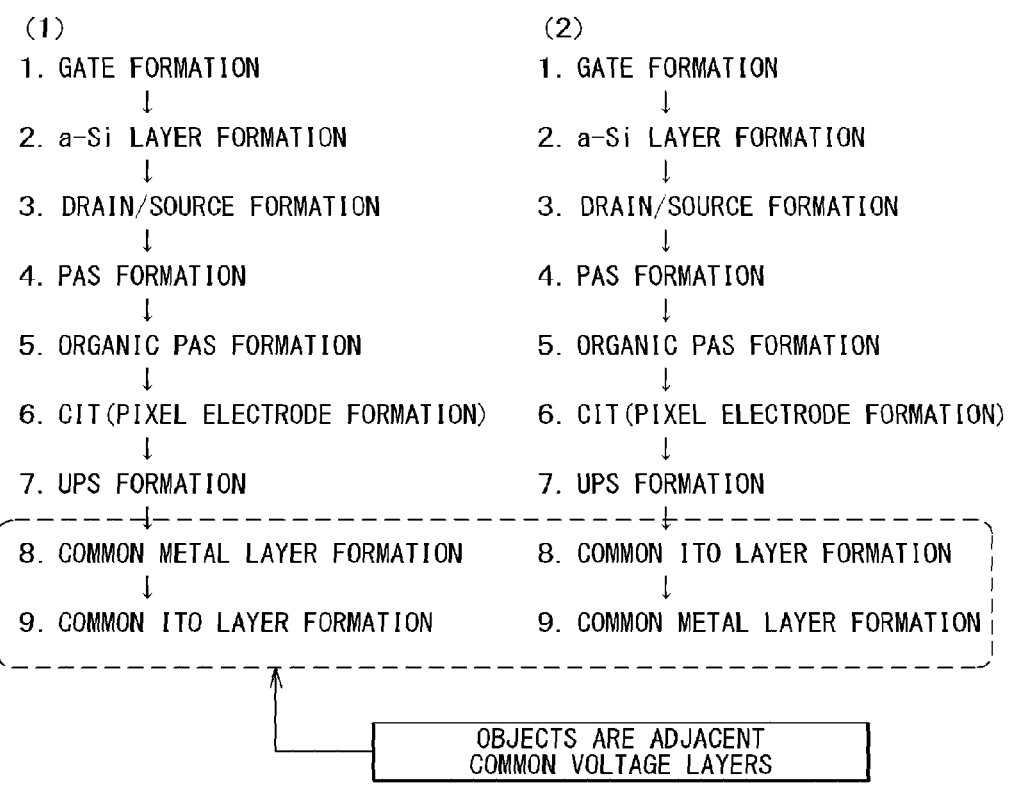
FIG. 2A is a process flow of a main manufacturing process of a pixel portion of a liquid crystal display device according to embodiments, which is examined by the inventors.
Figure 2B:
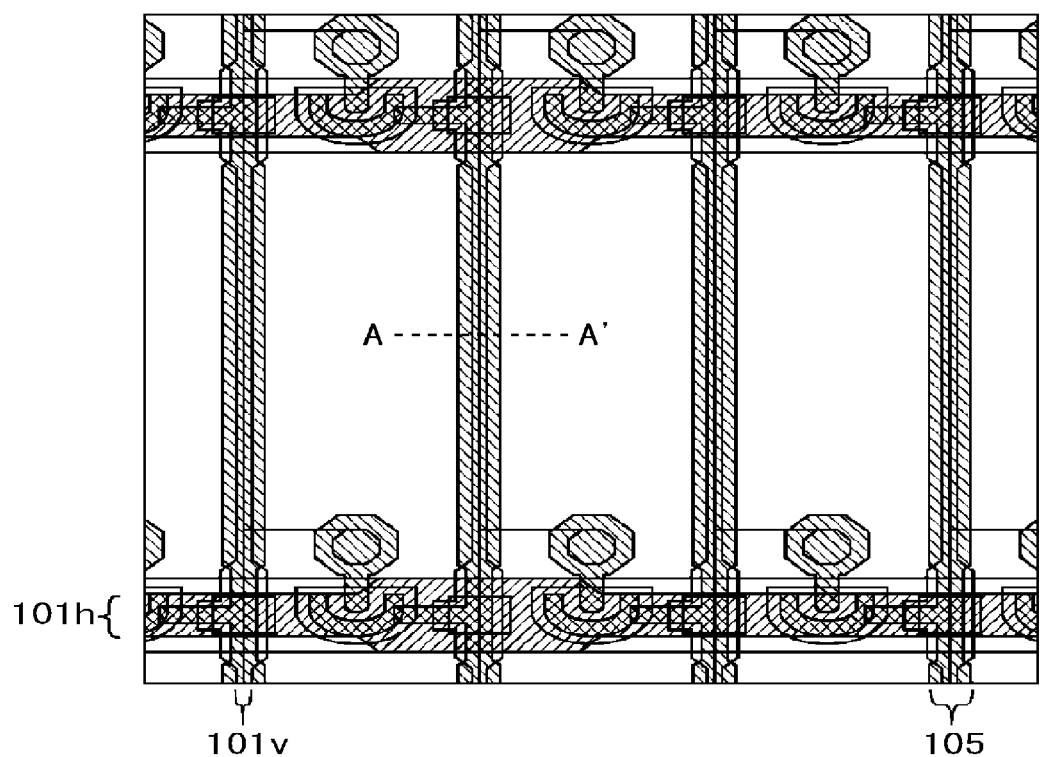
FIG. 2B is a process flow diagram of common wirings (in a state in which common metal wirings are formed) of a liquid crystal display device according to a first embodiment, which is examined by the inventors. An upper diagram is a plan view and a lower diagram is a cross-sectional view taken along a line A-A' in the upper diagram.
Figure 2B:
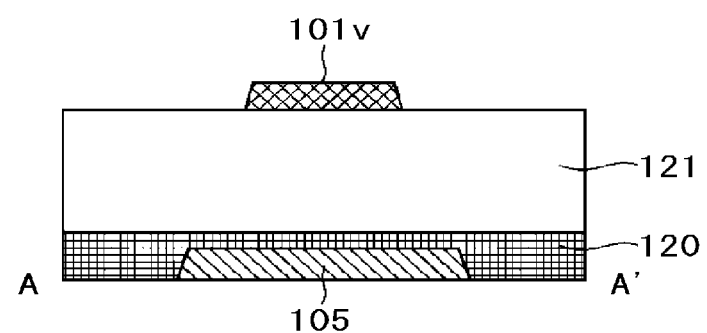

The inventors examined a cause of the change of appearance of the domain areas (non-transparent areas) when being driven. FIG. 2A (1) illustrates a process flow of a main manufacturing process of a pixel area examined by the inventors. By the processes 1 to 3, a switching thin film transistor (TFT) formed in the pixel area and a drain line connected to the drain of the TFT are formed. Subsequently, an inorganic passivation (PAS) film (process 4) and an organic passivation film are formed (process 5), and then a pixel electrode (CIT) connected to the source of the TFT is formed (process 6). Subsequently, an upper inorganic passivation film (UPS) is formed (process 7). Thereafter, a common metal layer and a common ITO are formed (processes 8 and 9). It is considered that the horizontal common metal wirings are time-proven and highly reliable, so that attention is paid to the vertical common metal wirings in particular.

Figure 3A:
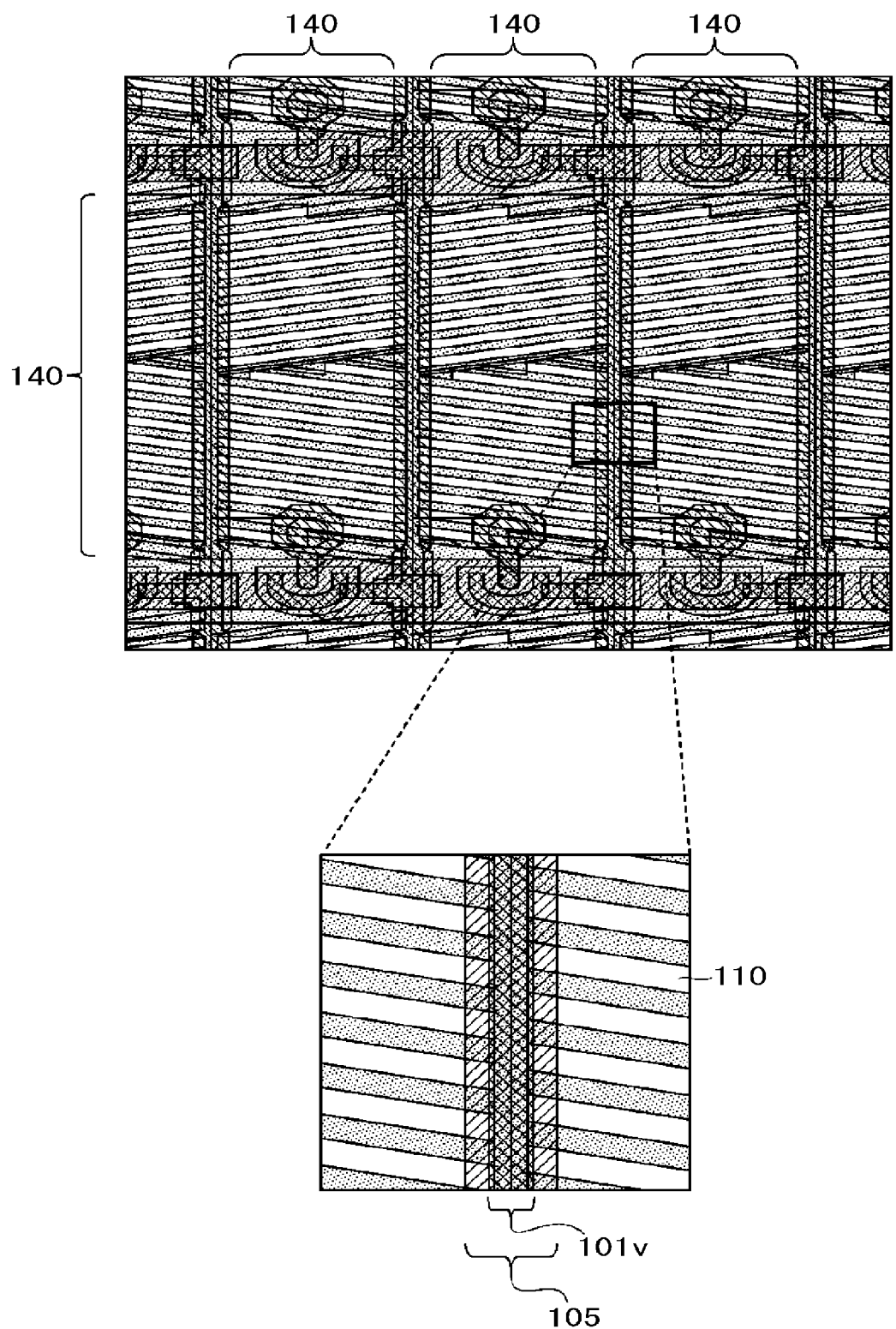
FIG. 3A is a plan view of a main part (common wirings) of the liquid crystal display device examined by the inventors and an enlarged plan view of a vertical common wiring portion.

FIGS. 3A and 3B illustrate a plan view of a main part (common wirings) of a liquid crystal display device examined by the inventors. An area in which a vertical area denoted by reference numeral 140 and a horizontal area denoted by reference numeral 140 cross each other is a pixel area. A vertical common metal wiring 101v is arranged in an area overlapping the drain line 105, which is a video signal line. FIG. 3A illustrates a case in which the appearance of the domain area (non-transparent area) varies.

As a result of this examination, it is found that the comb tooth tip is formed by ITO+metal in the upper diagram in FIG. 3B, but the comb tooth tip is formed by only ITO in the lower diagram in FIG. 3B. Therefore, the above difference is further examined. As a result, it is found that the position, thickness, length, and tip shape of comb of the comb tooth vary due to unevenness (variation of etching conditions, variation of positioning, and the like) of processing of a common ITO film, so that that is a case in which the common ITO reaches the vertical common metal wiring 101v and a case in which the common ITO does not reach the vertical common metal wiring 101v. The present invention is made by the new knowledge described above, and in the present invention, the comb tooth of the common ITO wiring is extended and connected between pixels adjacent to each other. Thereby, the comb tooth tip disappears, so that even if the processing is uneven, the positional relationship between the comb tooth tip and the common metal does not change. Therefore, the comb tooth tip is stably formed by ITO+metal. Thereby, it is possible to achieve uniform transmittance while suppressing smear error. Hereinafter, the present invention will be described using embodiments. The same reference numerals indicate the same components.

First Embodiment

A first embodiment of the present invention will be described with reference to FIGS. 2A to 2C and 4. Facts that are not described in the present embodiment among results of the examination of the inventors described above can be applied to the present embodiment unless there are special circumstances. FIG. 2A (1) is a process flow of a main manufacturing process of a pixel portion of a liquid crystal display device (C-Top IPS type) according to the present embodiment. A manufacturing method will be described with reference to FIG. 2A (1).

<Process 1: Form Gate>

First, a gate electrode is formed on a TFT substrate formed of glass. The gate electrode is formed in the same layer as that of a scanning signal line. A laminate in which a Mo alloy is laminated on an Al alloy is used for the gate electrode. However it is not limited to this. Next, an insulating film is formed from SiN. A portion of the insulating film, which covers the gate electrode, is a gate insulating film.

<Process 2: Form a-Si>

Subsequently, a semiconductor layer is formed at a position facing the gate electrode with the gate insulating film in between. In the present embodiment, as the semiconductor layer, an a-Si film is formed by plasma CVD. The semiconductor layer forms a channel portion of the TFT.

<Process 3: Form Drain/Source>

Subsequently, a source electrode and a drain electrode are formed on the semiconductor layer with the channel portion in between. An n+Si layer is formed between the semiconductor layer and the drain electrode or the source electrode. This is to form an ohmic contact between the semiconductor layer and the drain electrode or the source electrode. The drain electrode is also used as a video signal line. The source electrode and the drain electrode are formed in the same layer at the same time. In the present embodiment, the source electrode or the drain electrode is formed from a Mo alloy. When it is desired to reduce the electrical resistance of the source electrode or the drain electrode, for example, an electrode structure in which an Al alloy is sandwiched by Mo alloys may be used. The names such as source and drain are for convenience, and when one is termed as the source, the other can be called the drain.

<Process 4: Form PAS>

Subsequently, an inorganic passivation (PAS) film is formed from SiN to cover the TFT. The PAS film protects, in particular, the channel portion of the TFT from impurities.

<Process 5: Form Organic PAS>

Subsequently, an organic PAS film is formed on the PAS film and an opening from which the source electrode is exposed is formed in a laminated film of the PAS film and the organic PAS film.

<Process 6: CIT (Form Pixel Electrode)>

Subsequently, ITO (Indium Tin Oxide), which is a pixel electrode, is formed by sputtering to cover the laminated film of the PAS film and the organic PAS film which includes the opening from which the source electrode is exposed. The pixel electrode is formed to have a planar shape.

<Process 7: Form UPS>

Subsequently, an upper inorganic passivation (UPS) film is formed from SiN to cover the pixel electrode.

<Process 8: Form Common Metal>

Subsequently, a common metal film 101v is formed, coated with a photoresist film, exposed, and developed, and then the common metal film is processed. FIG. 2A illustrates a plan view of this state and a cross-sectional view taken along a line A-A' in the plan view. Reference numeral 105 denotes a drain line and reference numerals 120 and 121 denote an insulating film (PAS film, UPS film, and the like).

<Process 9: Form Common ITO>

Figure 2C:
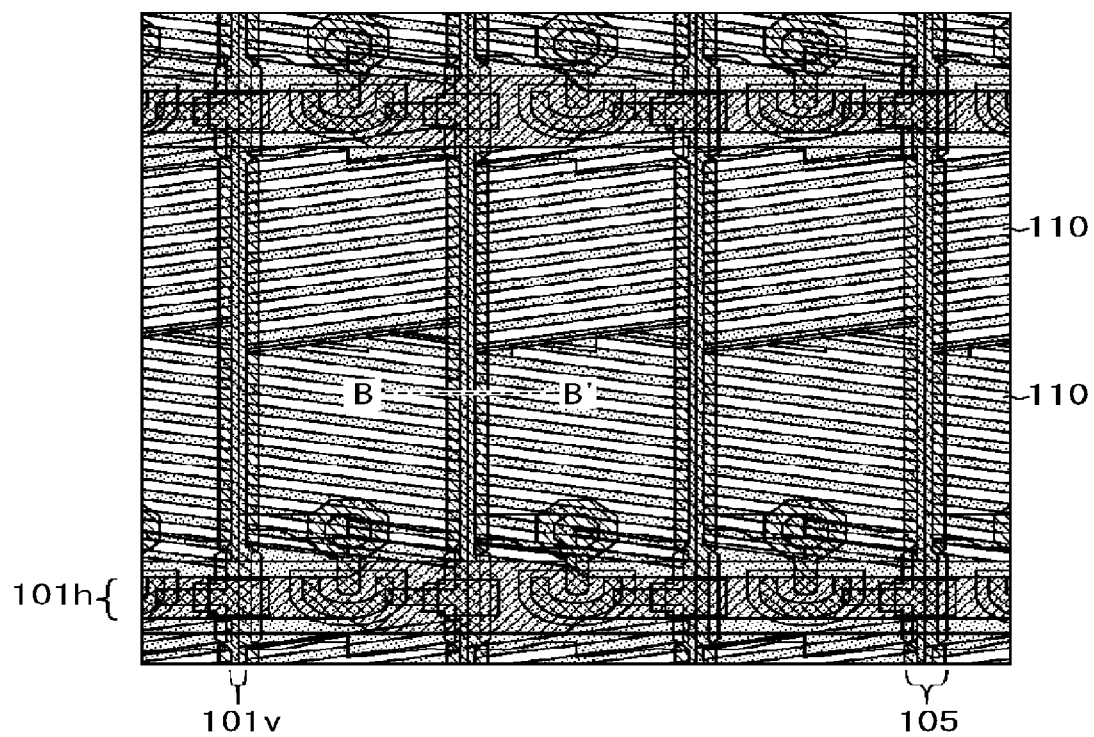
FIG. 2C is a process flow diagram of common wirings (in a state in which common ITO wirings are formed) of the liquid crystal display device according to the first embodiment, which is examined by the inventors. An upper diagram is a plan view and a lower diagram is a cross-sectional view taken along a line B-B' in the upper diagram.
Figure 2C:
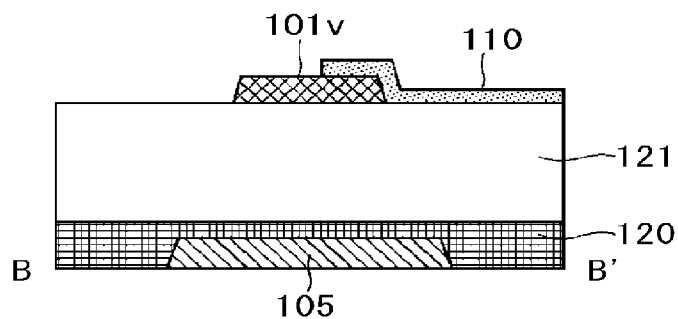

Subsequently, ITO (Indium Tin Oxide), which is a transparent conductive film, is formed on the entire display area by sputtering and common ITO wirings are formed by patterning the sputtered ITO. The common ITO wirings have a comb-teeth-shaped electrode structure. FIG. 2C illustrates a plan view of this state and a cross-sectional view taken along a line B-B' in the plan view, and FIG. 4 illustrates an enlarged view of the plan view. A common metal wiring 101v is connected to a common ITO wiring 110 (FIG. 2C) and their potentials are the same. As illustrated in FIG. 4, the comb-teeth-shaped common ITO wirings are connected between horizontally adjacent pixels (between pixels adjacent to each other with a vertical common metal wiring in between) and a comb tooth tip (pixel end portion) is formed from ITO+metal. By employing this configuration, the tip shape of the comb tooth can be stably formed even if the size and the position of the common wirings vary. Thereby, the domain areas (non-transparent areas) become stable, so that the transmittance becomes stable.

In the present embodiment, a part of upper surface and one side surface of the common metal wiring are covered by the common ITO wiring. However, the upper surface and both side surfaces of the common metal wiring may be covered by the common ITO wiring. The liquid crystal display device according to the present embodiment can be manufactured by the process flow illustrated in FIG. 2A (2). In this process flow, the common ITO wiring is formed in the process 8, and the common metal wiring is formed in the process 9.

Thereafter, the liquid crystal display device is formed by attaching together a counter substrate in which a color filter and a black matrix are formed and the aforementioned TFT substrate with a liquid crystal in between.

When the liquid crystal display device is applied to a display unit 150 of a monitor product illustrated in FIG. 6, occurrence of the smear error can be reduced or prevented. Reference numeral 160 denotes a frame.

As described above, according to the present embodiment, the common wirings are formed by the common ITO wirings and the mesh-shaped common metal wirings, and the comb-teeth-shaped common ITO wirings are connected between adjacent pixels, so that it is possible to provide a liquid crystal display device in which the smear error is suppressed and the transmittance is uniform.

Second Embodiment

Figure 5A:
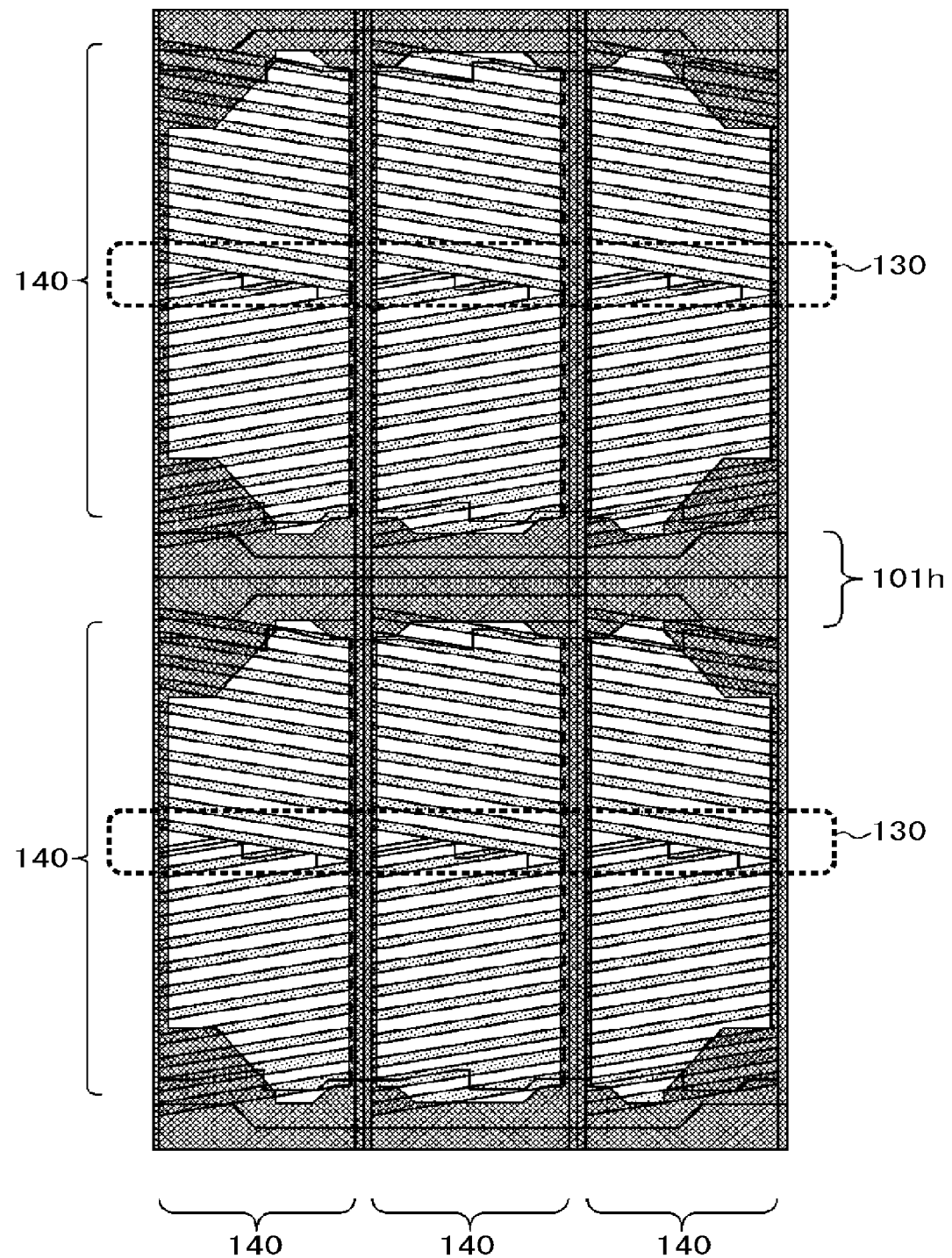
FIG. 5A is a plan view of a pixel portion of a liquid crystal display device (normal comb-teeth-shaped common ITO wirings) including mesh-shaped common metal wirings examined by the inventors.

As illustrated in FIG. 5A, a liquid crystal display device including normal comb-teeth-shaped common ITO wirings Forms a dual domain in one pixel, which is an area where a vertical area denoted by reference numeral 140 and a horizontal area denoted by reference numeral 140 cross each other, for a countermeasure against color shift. Therefore, a domain area (non-transparent area: light shielding area) 130 is formed at a central portion of a pixel. The domain area is formed by quick turn of the comb teeth at the central portion of the pixel and causes a domain loss. A second embodiment including avoidance of the domain loss will be described with reference to FIG. 5B. Matters which are described in the first embodiment but not described in the present embodiment can be applied to the present embodiment unless there are special circumstances.

FIG. 5B is a plan view of a pixel portion of a liquid crystal display device according to the present embodiment and illustrates horizontal multi-domain pixels. The structure illustrated in FIG. 5B may be referred to as a pseudo dual domain structure or a pseudo multi-domain structure. In the present horizontal multi-domain pixel, regarding the common ITO wirings extending slightly obliquely upward and the common ITO wirings extending slightly obliquely downward, which are so far arranged in one pixel, one set of wirings is arranged in one pixel and the other set of wirings is arranged in a pixel immediately below (above) the one pixel, so that a pseudo dual pixel is formed by using two pixels. When the size of the pixels is reduced, it is possible to reduce color shift in combination with an adjacent pixel. Also in the present configuration, the comb-teeth-shaped common ITO wirings are connected between horizontally adjacent pixels (between pixels adjacent to each other with a vertical common metal wiring in between) and a comb tooth tip is formed in combination with a vertical common metal wiring. As the horizontally adjacent pixels, there are a combination of a red pixel and a green pixel, a combination of a green pixel and a blue pixel, and a combination of a blue pixel and a red pixel. In the present configuration, there is no domain area (non-transparent area) in one pixel, so that it is possible to prevent the domain loss.

When the common metal wirings are formed on the common ITO wirings according to the process flow illustrated in FIG. 2A (2) and a liquid crystal display device having the configuration illustrated in FIG. 5B is manufactured and applied to the display unit 150 of the monitor product illustrated in FIG. 6, there is no domain loss, and occurrence of the smear error can be reduced or prevented. Reference numeral 160 denotes a frame.

As described above, according to the present embodiment, the common wirings are formed by the common ITO wirings and the mesh-shaped common metal wirings, and the comb-teeth-shaped common ITO wirings are connected between adjacent pixels, so that it is possible to provide a liquid crystal display device in which the smear error is suppressed and the transmittance is uniform. Further, it is possible to prevent the domain loss by employing the horizontal multi-domain pixels.

Third Embodiment

A third embodiment of the present invention will be described with reference to FIG. 5C. Matters which are described in the first and/or the second embodiments but not described in the present embodiment can be applied to the present embodiment unless there are special circumstances. In the first and the second embodiments, the extending direction of the comb teeth is approximately horizontal. However, in the present embodiment, a case in which the extending direction of the comb teeth is approximately vertical will be described.

Figure 5C:
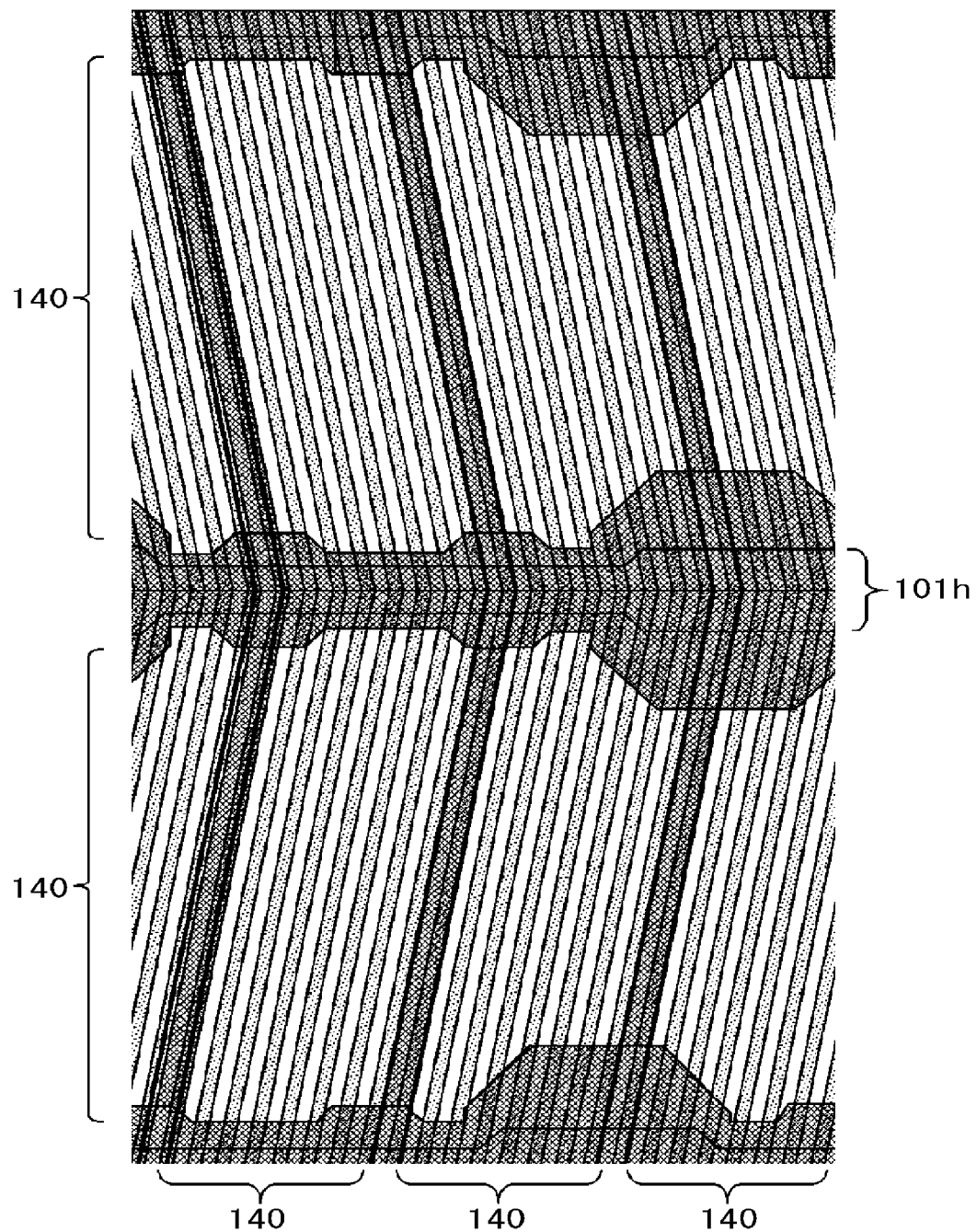
FIG. 5C is a plan view of a pixel portion of a liquid crystal display device according to a third embodiment of the present invention.

FIG. 5C is a plan view of a pixel portion of a liquid crystal display device according to the present embodiment and illustrates vertical multi-domain pixels. The structure illustrated in FIG. 5C may be referred to as a pseudo dual domain structure or a pseudo multi-domain structure. In the present vertical multi-domain pixel, regarding the common ITO wirings extending obliquely upward and the common ITO wirings extending obliquely downward, which are so far arranged in one pixel, one set of wirings is arranged in one pixel and the other set of wirings is arranged in a pixel immediately below (above) the one pixel, so that a pseudo dual pixel is formed by using two pixels. Also in the present configuration, the comb-teeth-shaped common ITO wirings are connected between vertically adjacent pixels (between pixels adjacent to each other with a horizontal common metal wiring in between) and a comb tooth tip is formed in combination with a horizontal common metal wiring. As the vertically adjacent pixels, there are a combination of a red pixel and a red pixel, a combination of a green pixel and a green pixel, and a combination of a blue pixel and a blue pixel. In the present configuration, there is no domain area (non-transparent area) in one pixel, so that it is possible to prevent the domain loss.

When the common metal wirings are formed on the common ITO wirings according to the process flow illustrated in FIG. 2A (2) and a liquid crystal display device having the configuration illustrated in FIG. 5C is manufactured and applied to the display unit 150 of the monitor product illustrated in FIG. 6, there is no domain loss, and occurrence of the smear error can be reduced or prevented. Reference numeral 160 denotes a frame.

As described above, according to the present embodiment, the common wirings are formed by the common ITO wirings and the mesh-shaped common metal wirings, and the comb-teeth-shaped common ITO wirings are connected between adjacent pixels, so that it is possible to provide a liquid crystal display device in which the smear error is suppressed and the transmittance is uniform. Further, it is possible to prevent the domain loss by employing the vertical multi-domain pixels.

The present invention is not limited to the embodiments described above, but various modified examples are included in the present invention. For example, the above embodiments are described in detail in order to explain the present invention in an easily understandable manner and are not necessarily limited to devices that include all the components described above. Further, a part of components of a certain embodiment can be replaced with components of another embodiment, and components of a certain embodiment can be added to components of another embodiment. It is possible to perform addition/deletion/replacement of other components on a part of components of each embodiment.

What is claimed is:

1. A display device comprising:
a display area performing a display of an image;
a plurality of pixels arranged in the form of a matrix in the display area;
scanning signal lines and video signal lines in the display area;
an insulating film above the scanning signal lines and the video signal lines;
a pixel electrode in the display area;
a counter electrode in the display area; and
a metal wiring above the insulating film,
wherein the metal wiring extends in a row direction of the plurality of pixels or a column direction of the plurality of pixels, and connects to the counter electrode in the display area, and
wherein the counter electrode has a plurality of slits which are continued for two or more pixels.

2. The display device according to claim 1, wherein the two or more pixels are pixels adjacent to each other across the video signal lines.

3. The display device according to claim 2, wherein the two or more pixels are pixels of a color different from each other.

4. The display device according to claim 1, wherein the two or more pixels are pixels are pixels adjacent to each other across the scanning signal line.

5. The display device according to claim 4, wherein the two or more pixels are pixels of the same color.

6. The display device according to claim 1, wherein a dual domain is formed in each pixel of the plurality of pixels.

7. The display device according to claim 1, wherein each of the two or more pixels across a scanning signal line is formed into a pseudo dual pixel.

8. The display device according to claim 1, wherein the metal wiring faces the video signal lines and the width of the metal wiring is smaller than that of the video signal lines.

9. The display device according to claim 1, wherein the insulating film is an organic film, and the pixel electrode and the counter electrode are disposed above the organic insulating film.

10. The display device according to claim 1, wherein the pixel electrode is disposed above an organic insulating film, and an inorganic insulating film is interposed between the pixel electrode and the counter electrode.

11. The display device according to claim 1, wherein a first area in which the counter electrode and the metal wiring are overlapped and a second area in which a slit of the counter electrode and the metal wiring are overlapped are formed above the video signal lines.

12. The display device according to claim 1, wherein a first area in which the counter electrode and the metal wiring are overlapped and a second area in which a slit of the counter electrode and the metal wiring are overlapped are formed above the scanning signal lines.

* * * * *